Figure 1:
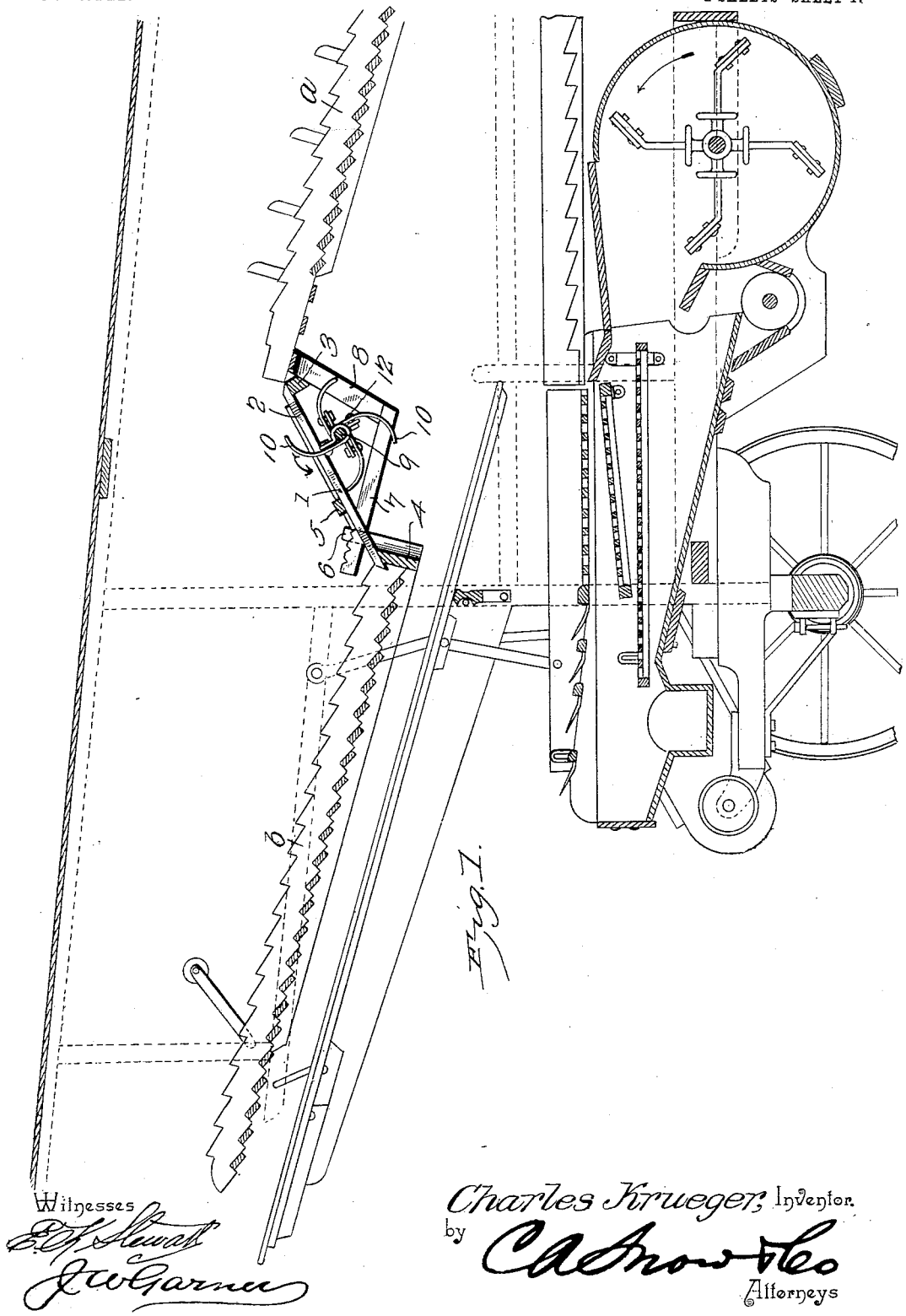

No. 751,657. PATENTED FEB. 9, 1904.
C. KRUEGER.
LEADER FOR THRESHING MACHINE STRAW CARRIERS.
APPLICATION FILED DEC. 14, 1901.
NO MODEL. 2 SHEETS—SHEET 1.

Witnesses

Charles Krueger, Inventor.
by C. A. Snow & Co
Attorneys

No. 751,657. PATENTED FEB. 9, 1904.
C. KRUEGER.
LEADER FOR THRESHING MACHINE STRAW CARRIERS.
APPLICATION FILED DEC. 14, 1901.
NO MODEL. 2 SHEETS—SHEET 2.
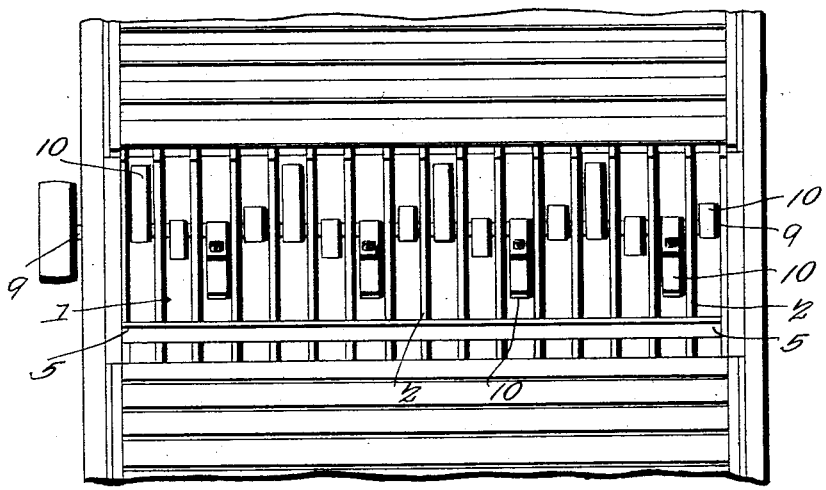

No. 751,657. Patented February 9, 1904.

UNITED STATES PATENT OFFICE.

CHARLES KRUEGER, OF WAUSAU, WISCONSIN.

LEADER FOR THRESHING-MACHINE STRAW-CARRIERS.

SPECIFICATION forming part of Letters Patent No. 751,657, dated February 9, 1904.

Application filed December 14, 1901. Serial No. 85,947. (No model.)

*To all whom it may concern:*

Be it known that I, CHARLES KRUEGER, a citizen of the United States, residing at Wausau, in the county of Marathon and State of Wisconsin, have invented a new and useful Leader for Threshing-Machine Straw-Carriers, of which the following is a specification.

My invention relates to improvements in leaders for the straw-carriers of threshing-machines, the object of my invention being to provide an improved revoluble leader which is a combined raking and agitating element and in connection with a grate disposed operatively with relation to the sections of the straw-carrier operates to effect a thorough agitation of the straw to separate the grain therefrom and to facilitate the passage of the straw over the straw-carrier, thereby preventing choking and increasing the capacity of the machine; and with this object in view my invention consists in the peculiar construction and combination of devices hereinafter fully set forth and claimed.

In the accompanying drawings, Figure 1 is a vertical longitudinal sectional view of a threshing-machine provided with my improved leader. Fig. 2 is a detail top plan view. Fig. 3 is a detail perspective view of the leader.

In the embodiment of my invention I provide a grate 1, which is adapted to be disposed in an inclined position between the proximate ends of the front and rear sections *a b* of the straw-carrier of a threshing-machine. The said straw-carrier section may be of any suitable construction. As here shown, the rear end of the front straw-carrier section *a* is higher than the front end of the lower straw-carrier section *b*.

The grate 1 comprises a series of longitudinally-disposed bars 2, which are suitably spaced apart, a cross-bar 3, which is disposed under and attached to the upper front ends of the bars 2, and a cross-bar 4, which connects the rear end of said bars 2 and is also disposed under them. Near the rear side of the grate is a clearing-bar 5, which connects the longitudinal bars 2 and is disposed on the upper sides thereof. The grate 1 moves with the straw-rack sections *a b* and may be supported by any suitable means. I here show standards 6, secured to the sides of the rear rack-section *b*, and rising therefrom inclined bars 7, connected to the said standards and to the said section *b*, and forwardly-inclined bars 8, which are rigidly connected to and extend upwardly from the said bars 7 to the under side of the front rack or carrier section *a* at the rear end thereof and are rigidly connected to the rear end of the said section *a*. The grate 1 rests against the said bars 8 at its upper side, and the sides of the said grate bear against the bars 7 and standards 6. Hence the grate is connected to both of the said sections *a b*.

My improved revoluble leader comprises a shaft 9 and a series of spring-arms, which are secured thereto and arranged spirally thereon. The said spring-arms are indicated in the drawings by the reference-numeral 10. Each spring-arm is formed from a single strip of spring metal, its outer portion is curved in the direction opposite to that of the revolution of the leader, and its inner end is doubled and bent around the shaft 9, as at 11, the overlapping portions of the leader-arms being clamped together by bolts 12 or other suitable devices. The shaft 9 is disposed transversely of the threshing-machine casing under the grate 1 and is journaled in suitable fixed bearings (not here shown) and which are in the main framing of the machine and is rotated by any suitable means. The arms or spring-wings of the leader operate in the spaces between the longitudinal bars of the grate, and it will be understood from an inspection of Fig. 1 of the drawings that when the threshing-machine is in operation and the straw rack or carrier sections, together with the grate 1, are vibrated longitudinally and the leader revolves the spring wings or arms of the leader will beat the straw from the under side thereof as it passes over the grate 1, thoroughly shake the straw to dislodge the grain therefrom, and move the straw rearwardly to facilitate the passage thereof over the straw rack or carrier, thereby increasing the efficiency and the capacity of the machine.

The clearing-bar 5 of the grate serves to clear the straw from the arms or wings of the revoluble leader at the rear side of the grate to prevent the straw from becoming wound around the shaft 9.

I do not desire to limit myself in the precise construction and combination of devices herein shown and described, as it is evident that modifications may be made therein without departing from the spirit of my invention.

Having thus described my invention, I claim—

1. In a device of the class described, the combination of two straw-carrying elements, the discharge end of one being elevated above, but not overlapping, the receiving end of the other, a grate connecting the discharge end of the first with the receiving end of the second straw-carrying element, supporting means for the said grate, a shaft journaled transversely in the space between the two straw-carrying elements, and curved flexible blades mounted upon said shaft and engaging between the bars of the grate beyond which they extend.

2. In a device of the class described, the combination of two straw-carrying elements, the discharge end of one being elevated above, but not overlapping, the receiving end of the other, a grate connecting the discharge end of the first with the receiving end of the second straw-carrying element, supporting means for said grate, a shaft journaled transversely in the space between the two grates, curved flexible blades connected with the shaft and extending between and beyond the bars of the grate, and a cleaning-bar mounted transversely upon said grate and adapted to be engaged by the end of the convex sides of the flexible blades.

3. In a device of the class described, the combination of two straw-carrying elements, the discharge end of one being elevated above, but not overlapping the receiving end of the other, an inclined grate connecting the discharge of the first with the receiving end of the second straw-carrying element, supporting means for said grate, a transverse shaft disposed in the space between the straw-carrying elements, and curved flexible blades extending from said shaft between and beyond the bars of the grate.

4. In a device of the class described, a revoluble shaft provided with a plurality of curved flexible blades, the inner end of each of said blades being bent around said shaft and connected with the body of such blade by means of a bolt whereby said blades may be tightened and adjustably mounted upon said shaft.

In testimony that I claim the foregoing as my own I have hereto affixed my signature in the presence of two witnesses.

CHARLES KRUEGER.

Witnesses:
JOHN BRASCH,
H. A. BEILKE.